US011999424B2

(12) United States Patent
Lubischer et al.

(10) Patent No.: US 11,999,424 B2
(45) Date of Patent: Jun. 4, 2024

(54) ROTATION CONTROL SYSTEM FOR A STEERING WHEEL AND METHOD

(71) Applicant: Steering Solutions IP Holding Corporation, Saginaw, MI (US)

(72) Inventors: Frank P. Lubischer, Commerce Township, MI (US); Richard K. Riefe, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 81 days.

(21) Appl. No.: 17/200,013

(22) Filed: Mar. 12, 2021

(65) Prior Publication Data

US 2021/0197892 A1     Jul. 1, 2021

Related U.S. Application Data

(63) Continuation of application No. 14/813,709, filed on Jul. 30, 2015, now abandoned.

(51) Int. Cl.
*B62D 6/00*     (2006.01)
*B62D 1/28*     (2006.01)
*B62D 5/00*     (2006.01)

(52) U.S. Cl.
CPC .............. *B62D 6/008* (2013.01); *B62D 1/28* (2013.01); *B62D 5/001* (2013.01)

(58) Field of Classification Search
CPC .......... B62D 6/008; B62D 1/28; B62D 5/001; B62D 6/007; A47B 23/00; A47B 23/06
USPC ........................................................... 701/23
See application file for complete search history.

(56) References Cited

U.S. PATENT DOCUMENTS

| 2009/0084291 | A1* | 4/2009 | Long | B60N 3/005 |
| | | | | 108/44 |
| 2013/0002416 | A1* | 1/2013 | Gazit | B62D 15/027 |
| | | | | 701/23 |
| 2015/0032322 | A1* | 1/2015 | Wimmer | B60W 50/085 |
| | | | | 701/23 |
| 2015/0088357 | A1* | 3/2015 | Yopp | B60W 30/00 |
| | | | | 701/23 |

FOREIGN PATENT DOCUMENTS

JP        H03282713 A   * 12/1991

* cited by examiner

*Primary Examiner* — Isaac G Smith
(74) *Attorney, Agent, or Firm* — Dickinson Wright PLLC

(57) ABSTRACT

A rotational control system for a steering wheel includes a steering wheel, the entire steering wheel switchable between a rotational condition and a non-rotational condition, a steering wheel angle of the entire steering wheel in a straight ahead position in the non-rotational condition. The rotational control system also includes a steering gear operatively coupled to the plurality of road wheels, the steering wheel and the steering gear electrically coupled to each other. The rotational control system further includes a controller in operative communication with the steering wheel and the steering gear, the controller configured to control the steering gear independent of the entire steering wheel when the vehicle is in an autonomous vehicle driving condition, and the controller configured to allow switching between the rotational condition and the non-rotational condition at any time while the vehicle remains in the autonomous vehicle driving condition

5 Claims, 2 Drawing Sheets

ROTATION CONTROL SYSTEM FOR A STEERING WHEEL AND METHOD

CROSS-REFERENCE TO RELATED APPLICATION

This patent application claims the benefit of priority to U.S. patent application Ser. No. 14/813,709, filed Jul. 30, 2015, the disclosure of which is incorporated by reference herein in its entirety.

BACKGROUND OF THE INVENTION

The embodiments described herein relate to steering wheel assemblies and, more particularly, to a rotation control system for a steering wheel.

As autonomously driven vehicles are developed, a number of opportunities will evolve related to entertainment and functionality for drivers. Steering wheels are commonly limited to standard driving positions due to the need for a driver to handle the steering wheel during operation of the vehicle. These limitations may be unnecessary during an autonomous driving mode of a vehicle.

SUMMARY OF THE INVENTION

According to one aspect of the disclosure, a rotational control system for a steering wheel includes a single steering wheel, the entire steering wheel switchable between a rotational condition and a non-rotational condition, a steering wheel angle of the entire steering wheel in a straight ahead position in the non-rotational condition, the rotational condition being rotation of the steering wheel that corresponds to angular displacement of a plurality of road wheels of a vehicle. The rotational control system also includes a steering gear operatively coupled to the plurality of road wheels, the steering wheel and the steering gear electrically coupled to each other. The rotational control system further includes a controller in operative communication with the steering wheel and the steering gear, the controller configured to control the steering gear independent of the entire steering wheel when the vehicle is in an autonomous vehicle driving condition, and the controller configured to allow switching between the rotational condition and the non-rotational condition at any time while the vehicle remains in the autonomous vehicle driving condition.

According to another aspect of the disclosure, an autonomously driven vehicle includes an autonomous driver assist system configured to provide directional control of a vehicle during an autonomous vehicle driving condition. The vehicle also includes a single steering wheel, the entire steering wheel switchable between a rotational condition and a non-rotational condition when the vehicle is in the autonomous vehicle driving condition, a steering wheel angle of the entire steering wheel in a straight ahead position in the non-rotational condition. The vehicle further includes a plurality of road wheels electrically coupled to the steering wheel and controlled by the autonomous driver assist system in the autonomous vehicle driving condition and controlled by the steering wheel when the vehicle is in a non-autonomous vehicle driving condition, the steering wheel allowed to be manually switched between the rotational condition and the non-rotational condition at any time while the vehicle is in the autonomous vehicle driving condition with a rotation switching device comprising one of a switch, a button, a handle, and a voice prompt, the rotational condition being rotation of the steering wheel that corresponds to angular displacement of the plurality of road wheels.

According to yet another aspect of the disclosure, a method of controlling a rotational condition of a single steering wheel is provided. The method includes switching between an autonomous vehicle driving condition and a non-autonomous vehicle driving condition, wherein a plurality of road wheels are electrically controlled by a steering wheel in the non-autonomous vehicle driving condition and the plurality of road wheels are controlled by an autonomous driving assist system in the autonomous vehicle driving condition. The method also includes manually switching between a rotational condition and a non-rotational condition of the entire steering wheel during operation in the autonomous vehicle driving condition with a rotation switching device comprising one of a switch, a button, a handle, and a voice prompt, a steering wheel angle of the entire steering wheel in a straight ahead position in the non-rotational condition, the rotational condition being rotation of the steering wheel that corresponds to angular displacement of the plurality of road wheels.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
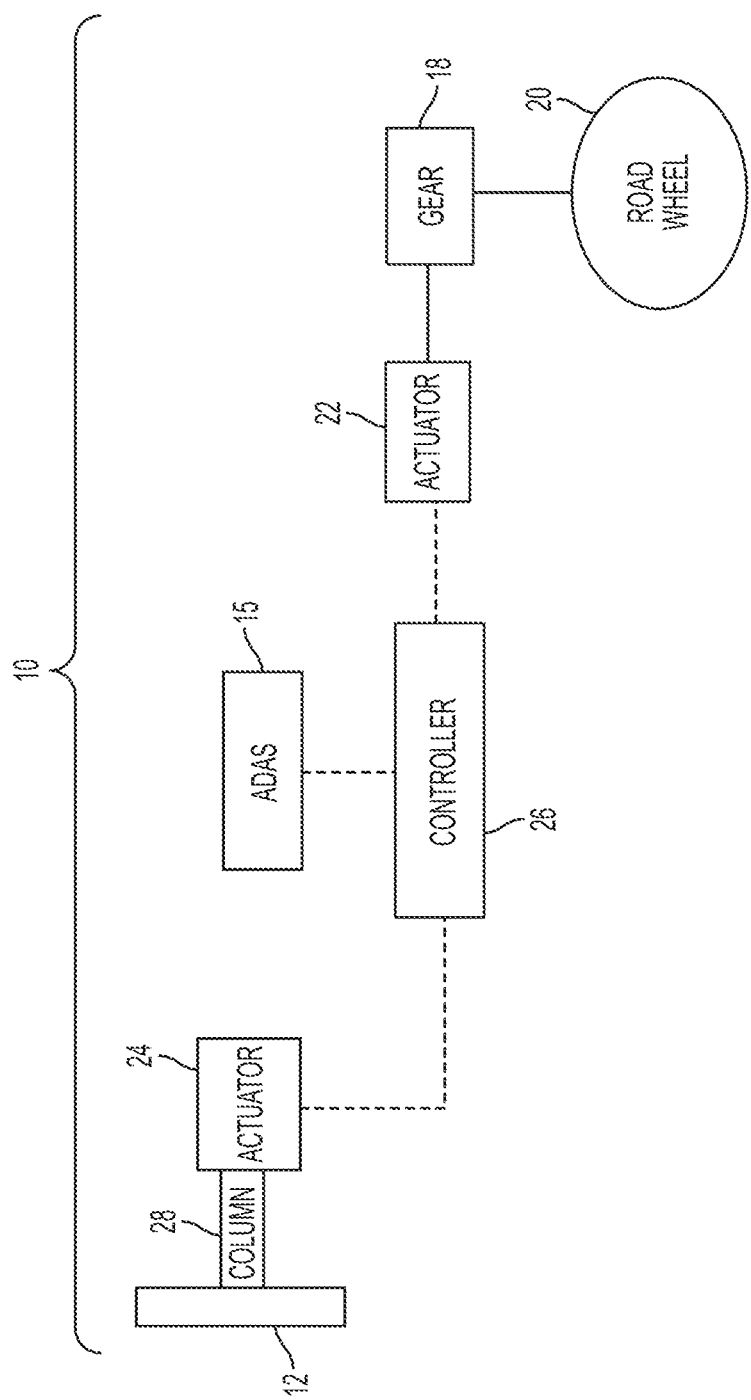
FIG. 1 schematically illustrates a vehicle having a rotational control system for a steering wheel.

Referring now to FIG. 1, where the invention will be described with reference to specific embodiments, without limiting same, a rotation control system 10 for a steering wheel 12 is provided. The rotational control system 10 facilitates switching between a rotatable condition of the steering wheel 12 and a non-rotatable condition of the steering wheel 12. Such control is advantageous in a vehicle that is capable of operating in an autonomous driving mode. Autonomous driving refers to vehicles that are configured to perform operations without continuous input from a driver (e.g., steering, accelerating, braking etc.) and may be equipped with an Advanced Driver Assist System(s), also referred to herein as an autonomous driving assist system 15. The autonomous driving assist system 15 includes processing equipment and a controller 26 that allows the vehicle to be autonomously controlled using sensing, steering, and/or braking technology. When the autonomous driving assist system 15 is activated, the steering wheel 12 is not required for vehicle control and, therefore, rotation of the steering wheel is not required during the autonomous driving mode. Fixing the steering wheel 12 in a non-rotational condition provides opportunities for a driver to use the steering wheel 12 as a workspace or armrest, for example, upon movement of the steering wheel 12 to different orientations from a standard driving position. In some embodiments, the steering wheel 12 is moved to a substantially horizontal orientation to allow objects to be rested thereon. Furthermore, non-rotation of the steering wheel 12 provides the ability to retract the steering wheel 12 to a stowed position that allows a driver to enjoy additional legroom, and more space generally.

The embodiments of the rotational control system 10 described herein may be employed in conjunction with numerous types of vehicles. In some embodiments, the vehicle is referred to as a "drive-by-wire" automobile that does not include a mechanical connection between the steering wheel and a steering gear 18 which is operatively coupled to a plurality of road wheels 20. In a drive-by-wire automobile, the steering wheel 12 and the steering gear 18 are electrically coupled. Guidance of the vehicle is performed by the use of an electric power steering gear 18 with an input shaft that is rotated by a first actuator 22, such as a servo actuator. The first actuator 22 receives an electronic communication signal of the steering wheel rotation made by the driver. The driver's feel of the road is simulated by a second actuator 24, such as a servo actuator, by applying tactile feedback in the form of torque to the steering wheel 12. The second actuator 24 is operatively coupled to the steering wheel 12. In the illustrated embodiment, the second actuator 24 is coupled to a steering column 28 that is coupled to the steering wheel 12.

As described above, the autonomous driving assist system 15 is configured to be activated when the autonomous vehicle driving condition is desired. The driver is able to switch between the autonomous vehicle driving condition and a non-autonomous vehicle driving condition. The non-autonomous vehicle driving condition includes a driver controlling the steering wheel to directionally control the vehicle in a conventional manner. The driver may switch between the autonomous and non-autonomous driving conditions (i.e., activate and deactivate the autonomous driving mode) by a prompt (e.g., "handshake"), such as a specific driver applied rotation or torque of the steering wheel 12. Alternative prompts may be used with a switch, button, handle, voice prompt, etc. Regardless of the prompt, the driving mode is switched to the desired condition.

Upon switching from the non-autonomous driving condition to the autonomous driving condition, the signal from the steering wheel 12 to the steering gear 18 is halted or ignored, thereby deactivating directional control of the road wheels 20 by the steering wheel. In such a transition, the autonomous driving assist system 15 is activated to directionally control the road wheels 20 of the vehicle. Sensors, navigational equipment, processing equipment, the controller 26 and/or other devices collectively are referred to as the autonomous driving assist system 15. The controller 26 is shown independently for illustrative purposes, but it is to be appreciated that the controller 26 is part of the autonomous driving assist system 15. In conjunction with the other devices of the autonomous driving assist system 15, the controller 26 directionally controls the road wheels 20 in the autonomous vehicle driving condition. In some embodiments, control includes controlling the first actuator 22, which works with the steering gear 18 to control the road wheels 20.

While in the autonomous vehicle driving condition, the steering wheel is switchable between the rotational condition and the non-rotational condition described above. In some cases, for a variety of reasons a driver may wish to maintain rotation of the steering wheel 12, even while the vehicle is operated in the autonomous driving condition. If rotation is desired, the driver simply allows the steering wheel 12 to rotate in a manner that corresponds to the angular displacement of the road wheels 20 while keeping his or her hands off of the wheel, so as to not inadvertently deactivate the autonomous driving condition. However, in many cases, a driver will desire a non-rotational condition of the steering wheel 12. As described above, during the non-rotational condition the steering wheel 12 may be employed as a functional or entertainment related structure. For example, the steering wheel 12 may be tilted to a substantially horizontal position, or any other angle, while the vehicle is in an autonomous driving condition. This enables for non-steering uses of the steering wheel 12. In one embodiment, non-rotation allows the steering wheel 12 to be used as a tray table to rest arms or objects on. For example, a cell phone or laptop may be placed thereon for use during the autonomous driving mode. In another embodiment, forward retraction of the steering wheel 12 toward the instrument panel of the vehicle enlarges the cabin space for additional driver comfort and convenience. In yet another embodiment, the non-rotating steering wheel provides a platform for electronic devices monitoring the cabin, driver, and vehicle controls due to the stationary orientation of the steering wheel.

As is the case with switching between the autonomous and non-autonomous driving conditions, the rotational and non-rotational conditions of the steering wheel 12 may be switched by a prompt (e.g., "handshake"), such as a specific driver applied rotation or torque of the steering wheel 12. Alternative prompts may be used with a switch, button, handle, voice prompt, etc.

Upon entering the autonomous driving condition, the autonomous driving assist system 15 interrupts or discontinues the signal that is normally sent from the steering wheel input to the first actuator 22 and/or steering gear 18, as described above. Simultaneously, the autonomous driving assist system 15, via the controller 26, communicates with the overall steering wheel assembly to stop rotation of the steering wheel 12 upon entry into the non-rotational condition, thereby rotationally locking the steering wheel 12. As described above, the driver is permitted to selectively switch between the rotational condition and the non-rotational condition while the vehicle is operated in the autonomous driving condition to obtain the advantages described above.

As one skilled in the art can appreciate, the physical angular position of the steering wheel 12 may be offset from the actual physical position of the road wheels 20 during, and immediately subsequent to, operation of the vehicle in the autonomous driving condition. As such, upon switching from the autonomous driving condition to the non-autonomous driving condition, actual transfer of directional control of the road wheels 20 to the driver is slightly delayed to accommodate realignment of the steering wheel 12, and any associated components, with the position of the road wheels 20. This delay is likely imperceptible to the driver.

Figure 2:
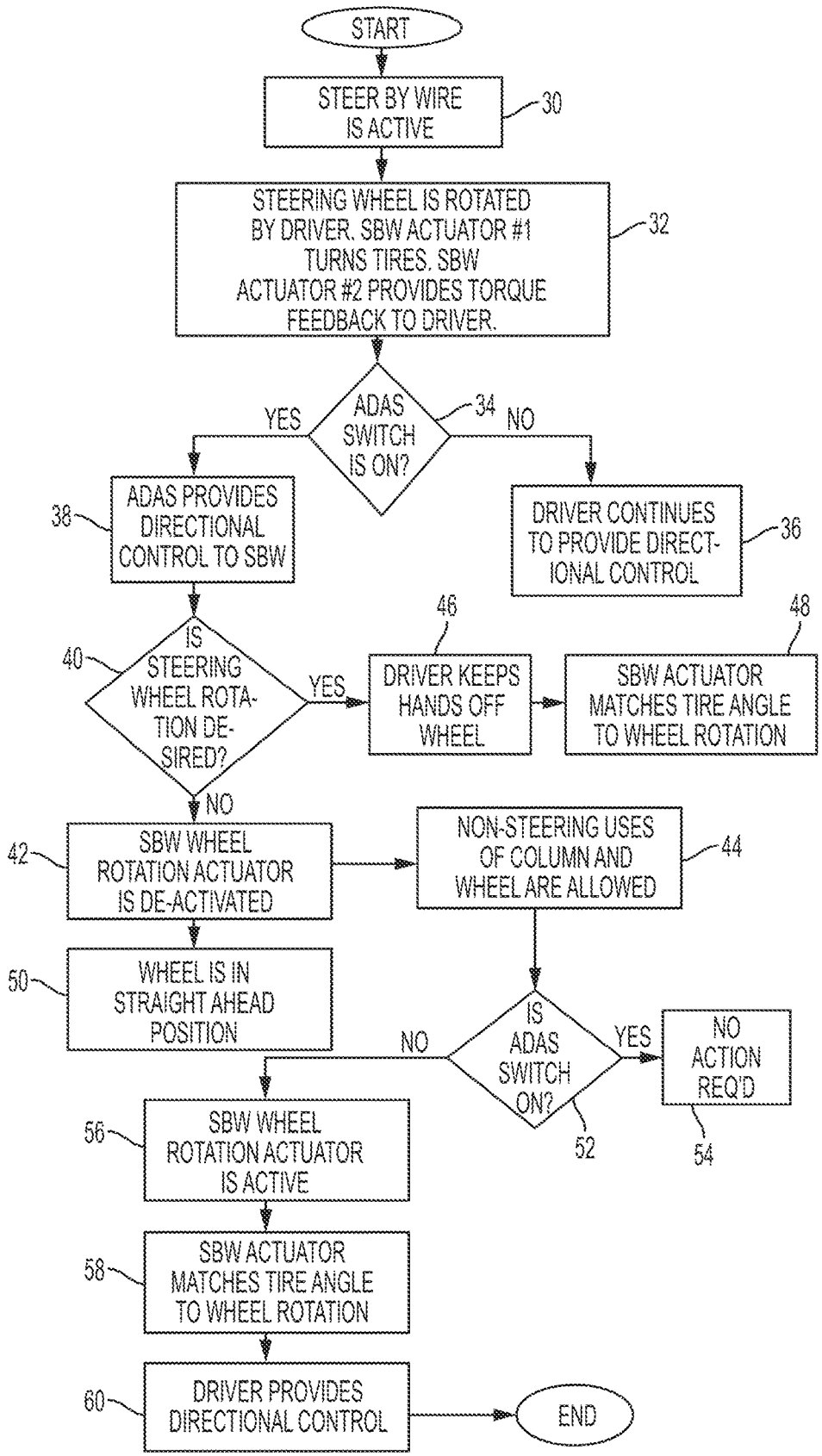
FIG. 2 is a flow diagram illustrating a method of operation of the rotational control system.

Referring to FIG. 2, a method of controlling rotation of the steering wheel is illustrated in the form of a flow diagram. The method includes operating 30 the vehicle in a drive-by-wire mode, with the driver directionally controlling 32 the road wheels with the steering wheel. The method also includes determining 34 if the autonomous driving assist system is activated. If it is not activated, the driver continues to provide steering control of the vehicle 36. If activated, the autonomous driving assist system provides steering control 38. In an activated state, the driver's selected wheel rotation condition is determined 40. If the driver has entered a prompt that selects the non-rotational condition of the steering wheel, the steering wheel enters the non-rotational condition 42 and the steering wheel may be employed for non-steering uses 44. If the driver has not entered a prompt that selects the non-rotational condition, the driver simply keeps his or her hands off of the steering wheel 46 and the second actuator matches the tire angle to the steering wheel rotation 48.

As described above, the physical angular position of the steering wheel 12 is matched to the actual physical position of the road wheels 20 upon switching from the autonomous driving mode to the non-autonomous driving mode. As shown in FIG. 2, the steering wheel is in a "straight ahead" position during the autonomous driving mode 50 in some embodiments. A determination 52 is made regarding whether the autonomous driving assist system is active. If active, no action is required 54 with respect to aligning the steering wheel to the road wheels. If not active 56, the system matches the steering wheel and road wheel angles 58 and then transitions to allowing the driver to provide directional control of the vehicle 60.

The flow diagram of FIG. 2 and its associated description above relates to a transition between the non-autonomous driving condition to the autonomous driving condition. As described above, to switch back to the non-autonomous driving condition from the autonomous driving condition, the driver simply enters a specified prompt that deactivates control of the road wheels with the autonomous driving assist system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rotational control system for a steering system comprising:
    a single steering wheel, the entire steering wheel switchable between a rotational condition and a non-rotational condition, a steering wheel angle of the entire steering wheel in a straight ahead position in the non-rotational condition, the rotational condition being rotation of the steering wheel that corresponds to angular displacement of a plurality of road wheels of a vehicle;
    a steering gear operatively coupled to the plurality of road wheels, the steering wheel and the steering gear electrically coupled to each other; and
    a controller in operative communication with the steering wheel and the steering gear, the controller configured to control the steering gear independent of the entire steering wheel when the steering system is in an autonomous steering condition, and the controller configured to allow switching between the rotational condition and the non-rotational condition at any time while the steering system remains in the autonomous steering condition, wherein the steering system is switchable between the autonomous steering condition and a non-autonomous steering condition with a predetermined driver applied rotation or torque of the single steering wheel, wherein the controller is part of an autonomous steering assist system capable of determining and controlling directional control of the vehicle; and
    a first actuator operatively coupled to the steering gear, the first actuator controlled by the steering wheel in the non-autonomous steering condition, the first actuator controlled by the autonomous steering assist system in the autonomous steering condition, wherein the autonomous steering assist system sends a signal to the first actuator in the non-autonomous steering condition and interrupts or discontinues the signal in the autonomous steering condition.

2. The rotational control system of claim 1, further comprising a second actuator operatively coupled to the steering wheel, the second actuator providing tactile feedback to a driver in response to movement of the steering gear and the plurality of road wheels.

3. The rotational control system of claim 1, wherein the steering wheel is switchable between the rotational condition and the non-rotational condition with a rotation switching device comprising one of a switch, a button, a handle, and a voice prompt.

4. The rotational control system of claim 1, wherein the steering wheel is displaceable to a horizontal position during the autonomous steering condition.

5. The rotational control system of claim 1, wherein the steering wheel angle is matched to a road wheel when switching from the autonomous steering condition to the non-autonomous steering condition.

\* \* \* \* \*